Patented Dec. 8, 1942

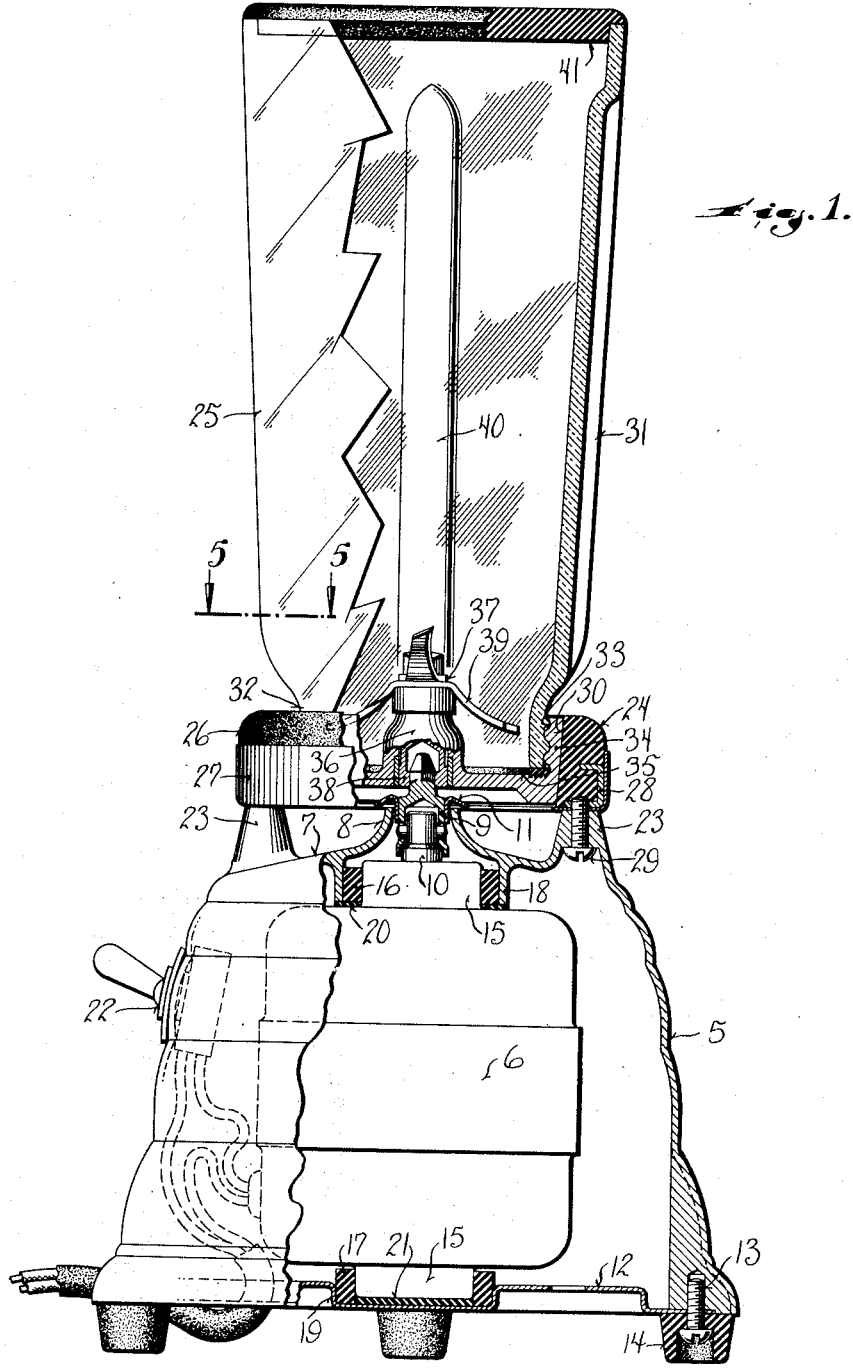

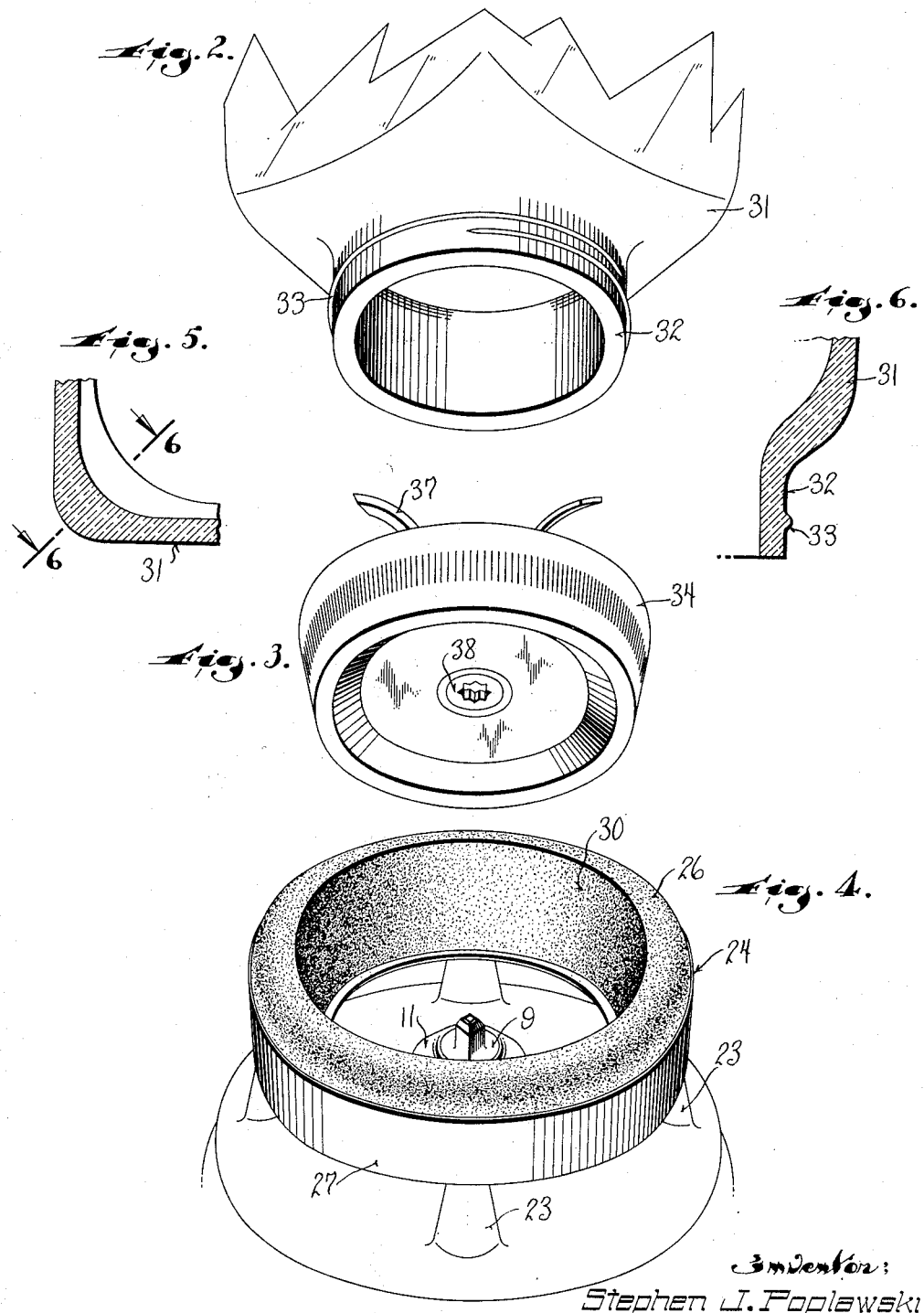

2,304,476

UNITED STATES PATENT OFFICE 2,304,476

FOOD AND BEVERAGE MIXER

Stephen J. Poplawski, Racine, Wis.

Application June 24, 1940, Serial No. 341,999

8 Claims. (Cl. 259—108)

This invention relates to improvements in food and beverage mixers of the type wherein the food or beverage to be mixed is placed in a container having an agitator therein adapted to be driven from an electric motor housed within the base of the machine upon which the container is removably set.

One of the problems encountered in mixers of this type was the difficulty of keeping the top of the base or motor housing clean and of preventing liquids from flowing down into the base and onto the motor.

It is, therefore, an object of this invention to provide means for supporting the container above the base in a manner which allows the top of the base to be formed with downwardly sloping surfaces to drain off any liquid or foreign matter spilled onto the base and which leaves the top of the base substantially unobstructed upon removal of the container to facilitate cleaning.

In this connection, it is another object of this invention to provide a novel guard surrounding the drive shaft or coupling which protrudes from the top of the base to preclude the ingress of liquids into the interior of the base.

Heretofore, the containers used in mixers of this type had their bottom walls integral with the side walls. As a result, it was not only difficult to clean the inside of the container but an expensive construction had to be employed to provide the necessary leakproof juncture between the bottom of the container and the bushing or bearing in which the agitator shaft revolved.

To obviate these difficulties the present invention has, as another of its objects, the provision of an improved construction for the containers of mixers of this type wherein the bottom is separate from the rest of the container and has the bearing bushing formed as an integral part thereof.

A further object of this invention is to provide a container having a glass side wall and a metal bottom which is screwed onto the lower end of the side wall.

Another object of this invention is to provide a container so constructed as to insure all portions of its contents coming in contact with the agitator blades.

Holding the container on the base has always presented a problem in mixers heretofore in use. Hence, the present invention has, as another of its objects, the provision of an improved manner of quickly detachably gripping or holding the container on the base.

In this connection, it is another object of this invention to provide a holder which has its portion that engages the container formed of rubber to insure a secure grip and in addition protect the container against breakage due to rough handling in setting it in place and removing it.

Inasmuch as devices of this type are generally used in locations where the base is apt to be wet, utmost assurance against possible electric shocks must be provided; and to this end, the present invention has, as a further object, the provision of novel means for mounting the motor whereby good electrical insulation is provided between the motor and the base with no part of the motor contacting any metal portion of the base.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may bay made as come within the scope of the claims.

The accompanying drawings illustrate one complete example of the physical embodiment of the invention constructed in accordance with the best mode so far devised for the practical application of the principles thereof, and in which—

Figure 1 is a side view of a mixer constructed in accordance with this invention, parts thereof being broken away and in section;

Figure 2 is a perspective view illustrating the lower portion of the container;

Figure 3 is a perspective view of the container bottom disconnected from the container proper;

Figure 4 is a perspective view of the holder for the container illustrating the manner in which it is mounted on the base;

Figure 5 is a detail sectional view through one corner of the container taken on the plane of the line 5—5 in Figure 1; and Figure 6 is a detail sectional view taken through Figure 5 on the plane of the line 6—6.

Referring now particularly to the accompanying drawings, in which like numerals indicate like parts, the numeral 5 designates the base of the machine which, as is customary, is hollow to provide a housing for an electric motor 6. The base is preferably a casting and has its top wall 7 sloping downwardly from a centrally apertured upwardly projecting neck 8 through which a coupling member 9 projects.

The coupling member is loosely but nonrotatably secured to the armature shaft 10 of the motor. An outwardly and downwardly flanged guard 11 larger in diameter than the hole through which the shaft passes is pressed onto the coupling member to prevent liquids and other foreign matter flowing down into the base and onto the motor.

The motor is secured in position by the attachment of a bottom plate 12 which closes the bottom of the base and is held by screws 13 which also mount rubber feet 14. To hold the motor and properly insulate it from the base, its bosses 15 which project from opposite ends thereof are received in rubber collars 16 and 17.

The collar 16 is gripped by a depending skirt 18 on the under-surface of the top wall of the base, while the collar 17 is set into a central depression 19 in the bottom plate 12. The insulation is completed by a washer 20 of insulating material interposed between the edge of the skirt 18 and the adjacent end wall of the motor and by a rubber disc 21 upon which the lower boss 15 rests.

The motor switch 22 is mounted in the front wall of the base where it may be conveniently actuated. Projecting up from the downwardly sloping top wall of the base are a number of standards or bosses 23. The tops of these bosses or standards are substantially in line with the top of the neck 8 and secured thereto is a holder 24 by which the container 25 of the mixing machine is held in position.

This holder consists of a ring 26 of rubber or other similar material set into a flanged metal reinforcing and finishing ring 27. The ring 27 has less height than the rubber ring so that the upper edge portion of the holder is non-metallic.

Embedded in the rubber ring and wholly encased within the finishing ring 27 are metal inserts 28 which have tapped holes to receive screws 29 passing upwardly through the bosses or standards 23. In this manner, the holder is rigidly secured to the tops of the bosses or standards with its inner peripheral wall 30 concentric to the axis of the motor. This inner peripheral wall is tapered to facilitate setting the container 25 in place and to improve its grip on the container.

The container consists of a glass sleeve or side wall 31 preferably square in cross section and provided with a circular neck 32 at its lower end. The neck has threads 33 formed thereon similar to those on conventional fruit jars.

Screwed onto the neck 32 is a substantially cup-shaped metal bottom 34. A rubber gasket 35 between the edge of the neck and the adjacent wall of the bottom insures a liquid tight connection.

The outer side wall of the cup-shaped bottom is tapered in correspondence with the inner wall 30 of the rubber ring and is of a size to fit snugly therein so that when the container is set in position, it is held against wobbling. If desired, the side wall of the bottom may be serrated, as illustrated in Figure 3 to improve the grip.

Projecting up from the central portion of the bottom 34 is a tubular pedestal 36 in which the shaft of a combined cutter and agitator 37 is journalled. The bearing for the agitator shaft is of the oilless type and the construction is such that liquid cannot enter the bore of the pedestal.

The lower end of the agitator shaft is formed as a female coupling member 38 to receive the projecting end of the driving coupling 9 as the container is placed in position.

It is to be observed that the combined cutter and agitator includes two downwardly directed blades 39, the ends of which come close to the inner wall of the reduced circular neck at the bottom of the glass sleeve. This is important as it assures the contents of the container coming in contact with the cutting and agitating blades; and to guard against having any portion of the contents lodge in the corners of the square glass sleeve out of reach of the agitator blades, the inner surfaces at the lower corners slope downwardly as shown in Figure 6.

Ribs 40 in the side walls of the glass sleeve cooperate with its square cross sectional shape to improve the mixing action; and as is customary, a removable cover 41 is provided to close the top of the container.

From the foregoing description taken in connection with the accompanying drawings, it will be readily apparent that this invention provides a food and beverage mixer having many advantages and desirable features, some of which are obvious. Particular stress, however, is placed upon the following:

The provision of the removable bottom for the container attached to the glass sleeve or side wall by means of conventional fruit jar threads which permits the substitution of an ordinary fruit jar for the glass sleeve so that the contents of the jar need not be removed therefrom to subject them to a mixing action, as the attachment of the bottom carrying the agitator to the jar transforms the jar into a mixing container;

The rubber ring on the holder which not only provides means for securely gripping the bottom of the container and holding it properly aligned with the drive shaft, but, being formed of rubber, guards against accidental breakage of the container during its application onto the machine and its removal therefrom;

The downwardly sloping top wall of the base and the fact that the container holder is spaced above it to leave the top wall substantially unobstructed which facilitates cleaning and precludes liquids flowing down into the base and onto the motor; and The mounting for the motor which not only completely electrically insulates the same from the base, but provides a cushioned support for the motor to guard against vibration and which further greatly facilitates assembly of the machine.

What I claim as my invention is:

1. In a mixing machine of the character described: a base having a top wall sloping downwardly from an aperture therein; a driving member revoluble in said aperture; a container having a revoluble agitator mounted in the bottom portion thereof; means for coupling the agitator to said driving member; and means spaced a substantial distance above the base for supporting the container on the base in a position with the coupling means connected to the driving member, said supporting means engaging the exterior sides of the lower portion of the container and engaging the sloping top wall of the base only at restricted areas so that liquids and foreign matter dropping onto the top wall of the base are free to drain therefrom.

2. In a mixer of the character described: a base having a substantially conical top wall with an aperture in its apex; a container having a rotatable agitator mounted therein; means for gripping the lower portion of the container and holding it in position above the apertured apex of the base, said means being connected to the sloping top wall of the base only as spaced areas so as not to interfere with free drainage of liquids and other substances dropped onto the sloping top wall of the base; a driving motor under the top wall of the base; a coupling member connected with the drive shaft of the motor and disposed in the apertured apex of the base to be accessible to a complementary coupling member for the agitator mounted in the container; and a guard fixed to and encircling the first designated coupling member in sealed relationship therewith, said guard having an outwardly directed flange overlying the rim of the aperture in the apex of the base to prevent dropping liquids and other foreign matter from passing through said aperture.

3. In a mixing machine of the character described: a hollow base providing a motor housing and having a one-piece substantially centrally apertured top wall; a drive motor within the housing; a coupling member connected with the drive shaft of the motor and disposed in the aperture of the top wall; a container having a circular bottom portion and having a revoluble agitator provided with a coupling member exposed at the bottom of the container for connection with the coupling member driven by the motor; and means for holding the container in proper position on the base with the coupling members engaged comprising a plurality of standards rising up from spaced restricted areas of the top wall of the base, and a ring-shaped holder on the free ends of the standards so as to be spaced a distance above the base and engageable with the sides of the circular lower portion of the container to align the same axially with the drive shaft of the motor.

4. In a mixing machine of the character described: a hollow base having a centrally apertured substantially cone-shaped top wall; a drive motor within the interior of the base; a coupling member connected to the armature of the motor and revoluble in the apertured apex of the top wall; a container having a circular bottom portion provided with a substantially flat end wall adapted to be disposed directly adjacent to the apex of the conical top wall of the base, said container having an agitator revoluble in its lower portion; a coupling member connected with the agitator, said coupling member having no portion thereof projecting outside the container past said end wall thereof, but being accessible at the bottom of the container to be drivingly connectible with the motor driven coupling member; and means for holding the container with its end wall in proper position directly above the base and with the coupling members engaged, said means comprising a plurality of standards rising up from spaced areas of the base, and an annular holder mounted on the standards and arranged to grip the circular lower portion of the container.

5. In a mixing machine of the character described: a hollow base having a centrally apertured substantially cone-shaped top wall; a drive motor within the interior of the base; a coupling member connected to the armature of the motor and revoluble in the apertured apex of the top wall; a container having a circular bottom portion provided with a substantially flat end wall adapted to be disposed directly adjacent to the apex of the conical top wall of the base, said container having an agitator revoluble in its lower portion; a coupling member connected with the agitator, said coupling member having no portion thereof projecting outside the container past said end wall thereof but being accessible at the bottom of the container to be drivingly connectible with the motor driven coupling member; and means for holding the container with its end wall in proper position directly above the base and with the coupling members engaged, said means comprising a plurality of standards rising up from spaced areas of the base, and a ring of rubber secured to the standards with its inner peripheral wall arranged to frictionally grip the circular lower portion of the container.

6. In a mixing machine of the character described having a base and a container adapted to be removably set onto the base in a predetermined position with respect thereto, the sides of the container at the bottom portion thereof tapering outwardly toward the upper end of the container; means for holding the container in position comprising a ring of material having a high coefficient of friction and having its inner peripheral wall surface formed with a complementary taper to grip the lower portion of the container with a wedge action; and spaced standards for supporting the ring above the top wall of the base.

7. In a mixing machine of the character described having a base and a container adapted to be removably set onto the base in a predetermined position with respect thereto; means for holding the container in position comprising a ring of material having a high coefficient of friction and having its inner peripheral wall surface formed to grip the lower portion of the container; metal inserts in the ring each having a flange normal to the axis of the ring; standards rising up from the top wall of the base and having the ring resting thereon; and screws passing upwardly through the standards and threaded into the flanges of said metal inserts.

8. In a mixing machine of the character described having a base and a container adapted to be removably set onto the base in a predetermined position with respect thereto, the sides of the container at the bottom portion thereof tapering outwardly toward the upper end of the container; an agitator within the lower portion of the container having a coupling member exposed at the bottom wall of the container; a power driven coupling member accessible at the top wall of the base and connectible with the agitator coupling to transmit rotation to the agitator upon application of the container to the base with its coupling member in axial alignment with the power driven coupling member; and means on the base for firmly removably holding the container in position on the base with its coupling member axially aligned with the power driven coupling member whereby the agitator is drivingly connected with said power driven coupling member, comprising a ring of material having a high coefficient of friction, said ring having its inner peripheral wall tapered in correspondence with the taper on the bottom portion of the container to grip the same with a wedge action and thereby hold the container and its coupling member centered with respect to the power driven coupling member.

STEPHEN J. POPLAWSKI.